US007775886B2

(12) United States Patent
Krishnamoorthy et al.

(10) Patent No.: US 7,775,886 B2
(45) Date of Patent: Aug. 17, 2010

(54) TARGETED MERCHANDISING ON A USER CONSOLE

(75) Inventors: Shyam Krishnamoorthy, Kirkland, WA (US); Daniel E. Walther, Redmond, WA (US); Daniel S. Holt, Kirkland, WA (US); James Nicholas Helm, Redmond, WA (US); Jerry Paul Hook, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 1345 days.

(21) Appl. No.: 11/172,192

(22) Filed: Jun. 30, 2005

(65) Prior Publication Data

US 2007/0005450 A1    Jan. 4, 2007

(51) Int. Cl.
    *A63F 9/24* (2006.01)
(52) U.S. Cl. .............................. 463/43; 463/42; 705/26
(58) Field of Classification Search .................. 463/42, 463/43; 705/26
    See application file for complete search history.

(56) References Cited

U.S. PATENT DOCUMENTS

| | | | | |
|---|---|---|---|---|
| 4,775,935 | A | 10/1988 | Yourick | 715/811 |
| 5,592,375 | A | 1/1997 | Salmon et al. | 705/7 |
| 6,266,649 | B1* | 7/2001 | Linden et al. | 705/26 |
| 6,475,083 | B1 | 11/2002 | Gomez et al. | 463/1 |
| 6,539,544 | B2 | 3/2003 | Ebisawa | 717/177 |
| 6,582,310 | B1 | 6/2003 | Walker et al. | 463/42 |
| 6,616,533 | B1* | 9/2003 | Rashkovskiy | 463/31 |
| 6,629,079 | B1* | 9/2003 | Spiegel et al. | 705/26 |
| 2001/0034635 | A1 | 10/2001 | Winters | 705/10 |
| 2001/0044751 | A1 | 11/2001 | Pugliese, III et al. | 705/26 |
| 2002/0087876 | A1* | 7/2002 | Larose | 713/200 |
| 2003/0167230 | A1* | 9/2003 | McCarthy | 705/40 |
| 2003/0181242 | A1* | 9/2003 | Lee et al. | 463/42 |
| 2005/0026694 | A1 | 2/2005 | Kelly et al. | 463/42 |

FOREIGN PATENT DOCUMENTS

WO    WO 02/05229 A2    1/2002

OTHER PUBLICATIONS

"Backbone Entertainment and The Collective Merge to Form Foundation 9 Entertainment." http://www.pcvsconsole.com/news.php?nid=2989&pl=console. pp. 1-3.

(Continued)

*Primary Examiner*—Joe H. Cheng
*Assistant Examiner*—Andrew Kim
(74) *Attorney, Agent, or Firm*—Workman Nydegger (57) ABSTRACT

Advertising is targeted to a specific user of a user console. A product data request is received from a user console and includes a user identifier, user data, and at least a first product identifier. A user account record associated with the user identifier is identified. The user account record includes a subscription service level identifier and a user account history. The user data are then associated with the user account record. A product catalog is searched for any product related entries associated with the request, and when any product related entries associated with the product data request are found, each such product related entry is provided to the user console.

21 Claims, 9 Drawing Sheets

OTHER PUBLICATIONS

"Game Collector game database software." http://collectorz.com/game/;http://collectorz.com/game/features. pp. 1-2.

"New Console on the Block." Sep. 2000. http://www.womengamers.com/interview/indrema.php. pp. 1-4.

"Ps2List.Com." http://www.ps2list.com/.

Drucker, Steven M. "Spectator Games: A New Entertainment Modality for Networked Multiplayer Games."http://research.microsoft.com/~sdrucker/papers/spectator.pdf. pp. 1-7.

* cited by examiner

TARGETED MERCHANDISING ON A USER CONSOLE

BACKGROUND

In recent years, game consoles have become quite popular consumer devices, becoming a ubiquitous fixture in homes around the world. In particular, the increasing market penetration of game consoles has inspired game developers and others to work diligently to develop new game titles and other applications for game consoles. Traditionally, when a new game or product for a game console is released, a marketing group places advertisements and develops merchandising materials for retail outlets to inform consumers about the newly available products. Common media channels for advertising include print and online magazines, fanzines, Internet retailers, select websites, television commercials, and the like. However, outside of such conventional media channels, it is often difficult to alert game console owners of new products for their console that may be of interest to them. Furthermore, there are often so many products available that are related to a single game title or game series, such as additional game levels and add-in components, that it is impractical to advertise all of them through some focused media channel in a conventional manner.

Similarly, it has historically been difficult to provide a simple and expedient way for consumers to learn about and purchase the multitude of new products that are available to them. Although desirable, it has been even more elusive to develop a way for consumers to learn about related products that might interest a consumer, based on the specific games, applications, and media already purchased by the consumer. Many companies presently market products to consumers based on a demographic profile created from the consumer's own purchases, using for example, credit and debit card purchase histories, models developed by marketing experts, and other data derived from online transactions by consumers. However, consumers such as children typically do not have a credit or debit card that is used in making purchases of goods and which can thus provide historical data for targeting these consumers based on their prior purchases. Furthermore, many adult consumers are concerned with the privacy of their credit account transactions and limit the use of debit and credit purchases or take steps to prevent data related to those purchases from being collected. Thus, there is a substantial need for alternative approaches that can facilitate more effective merchandising of electronic media related content.

SUMMARY

Various techniques are described for providing targeted marketing to a user console. One such technique involves receiving a product data request from a user console. The product data request includes a user identifier, user data, and at least a first product identifier. The technique also includes identifying a user account record associated with first user identifier. The user account record includes a subscription service level identifier, and a user account history. The user data are associated with the user account record. A product catalog having a plurality of product related records is searched for any product related records associated with the request, and when any product record associated with the product data request is identified, each such product related record is provided to the user console.

Another aspect is directed to a memory medium that stores machine instructions for presenting a marketplace dialog screen on a user console interface. The memory medium also stores machine instructions for enabling a request for product related data to be initiated. The request for product related data includes a user identifier associated with a user account record and at least one product identifier. The user account record includes a user service level indicator and a user account history. The memory medium further stores machine instructions for populating the marketplace dialog screen based on any received product data records. The product data records correspond to the requested product data and are based on the user account record, the service level indicator, and one or more predetermined criteria.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive.

Exemplary Gaming and Media System

Figure 1:
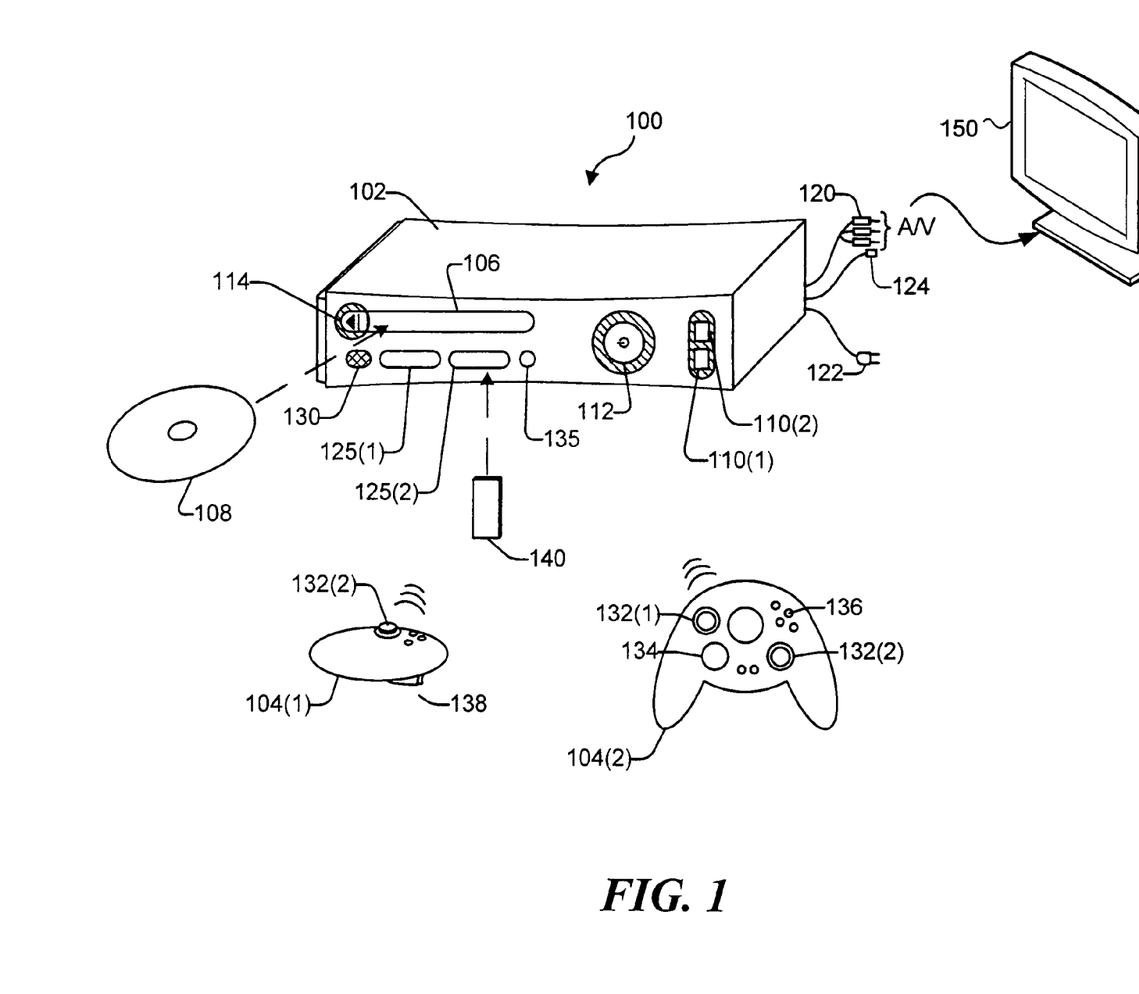
FIG. 1 is an isometric view of an exemplary gaming system with which at least one embodiment of system automated merchandising can be employed.

FIG. 1 shows an exemplary gaming and media system 100. The following discussion of this Figure is intended to provide a brief, general description of a suitable environment in which certain methods may be implemented. As shown in FIG. 1, gaming and media system 100 includes a game and media console (hereinafter simply "console") 102, which an example of what is referred to in the claims that follow as a "user console." In general console 102 is one type of computing device or system, as further described below, and is exemplary of a device that is used in connection with dynamically merchandising, but is not intended to be limiting. Console 102 is configured to accommodate one or more wireless controllers, as represented by controllers 104(1) and 104(2). Further, console 102 is equipped with an internal hard disk drive (not shown), and a portable media drive 106 that supports various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two Universal Serial Bus (USB) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet.

Each controller 104 is coupled to console 102 via a wired or wireless interface. In the illustrated implementation, the controllers are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation (not shown), a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games and other electronic content stored on a memory medium (internal and/or portable as discussed below), shopping for and purchasing products such as electronic media including game and game component downloads, and reproducing pre-recorded music and videos, from both electronic and hard media sources. With the different storage offerings, titles can be played from the hard disk drive, from optical disk media (e.g., 108), from an online source, or from MU 140. A sample of some of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

Functional Details of Exemplary Gaming and Media System

Figure 2:
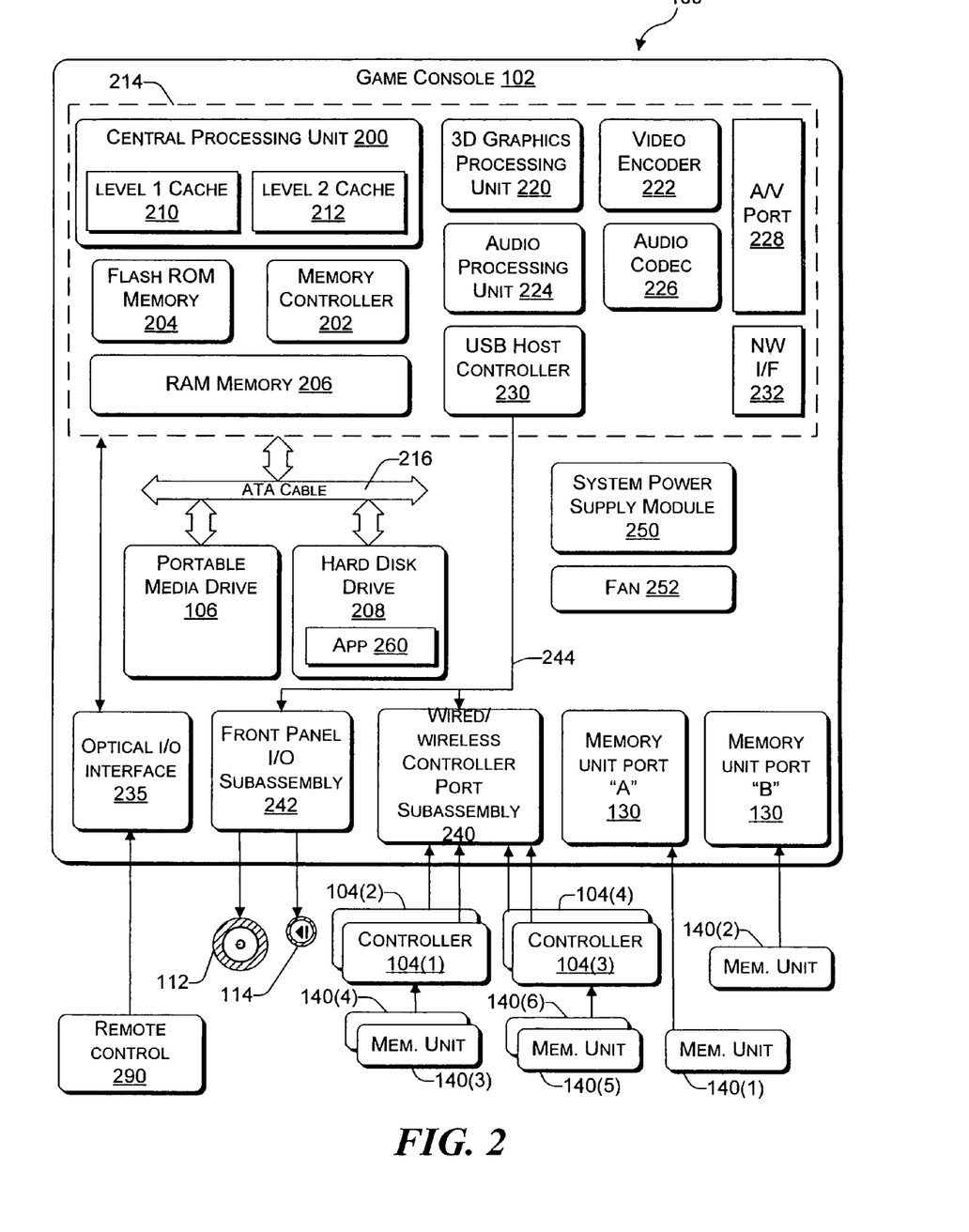
FIG. 2 is an exemplary functional block diagram of a gaming system like that shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210, and a level 2 cache 212 to temporarily store data and hence reduce the number of memory access cycles made to the hard drive, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a Peripheral Component Interconnect (PCI) bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a Bluetooth module, a cable modem, and the like.

In the implementation depicted in FIG. 2, console 102 includes a controller support subassembly 240, for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any one or more of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102.

To implement one or more method steps, an application 260 comprising machine instructions is stored on hard disk drive 208. When console 102 is powered on, various portions of application 260 are loaded into RAM 206, and/or caches 210 and 212, for execution on CPU 200. Application 260 is described below in more detail. In general, application 260 can include one or more program modules for performing various display functions, such as controlling dialog screens for presentation on a display (e.g., high definition monitor 150), controlling transactions based on user inputs and controlling data transmission and reception between the console 100 and externally connected devices.

Gaming system 100 may be operated as a standalone system by simply connecting the system to high definition monitor 150 (FIG. 1), a television, a video projector, or other display device. In this standalone mode, gaming system 100 enables one or more players to play games, or enjoy digital media, e.g., by watching movies, or listening to music. However, with the integration of broadband connectivity made available through network interface 232, gaming system 100 may further be operated as a participating component in a larger network gaming community or system, as discussed below in connection with FIG. 4.

Exemplary Computing System

Figure 3:
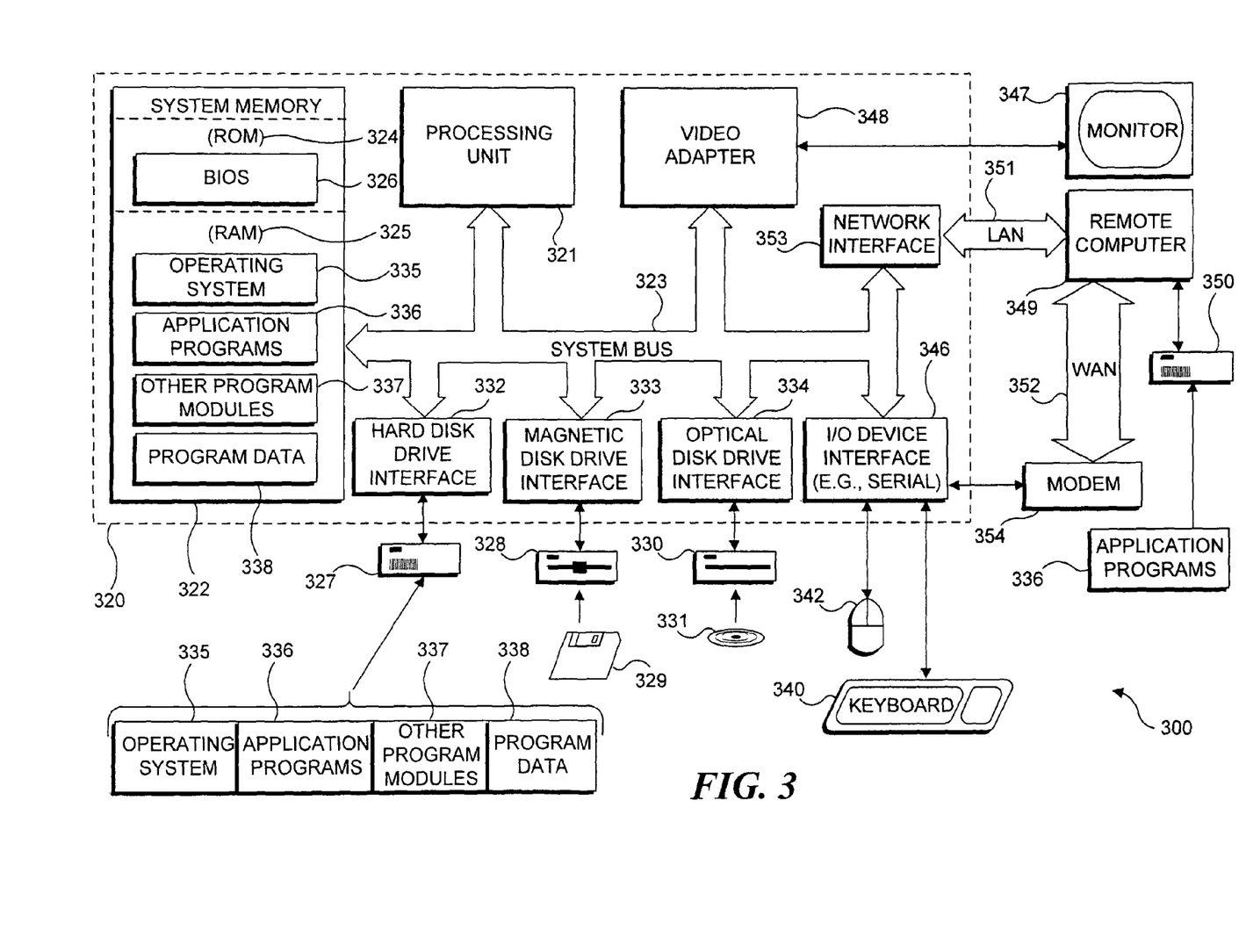
FIG. 3 is a functional block diagram of an exemplary computing system, which is useful for servicing requests in connection with dynamic merchandising, as discussed below.

FIG. 3 is a functional block diagram of an exemplary computing system and/or computer server for serving digital media to the computing device of connected clients, such as gaming and media system 100 or a similar computing system, and for use in implementing dynamically merchandising when connected in communication with one or more consoles operated by users. In one or more embodiments, it should be emphasized that only users with specific consoles are able to benefit from the dynamic merchandising provided by the exemplary computing system and/or computer server like that shown in FIG. 3, since only such consoles are permitted to connect with the computing system and/or computer server offering the dynamic merchandising.

The following discussion is intended to provide a brief, general description of a suitable computing environment in which certain methods may be implemented. Further, the following discussion illustrates a context for implementing computer-executable instructions, such as program modules, with a computing system. Generally, program modules include routines, programs, objects, components, data structures, etc. that perform particular tasks or implement particular abstract data types. The skilled practitioner will recognize that other computing system configurations may be applied, including multiprocessor systems, mainframe computers, personal computers, processor-controlled consumer electronics, personal digital assistants (PDAs) (but likely not when used as a server of digital media content), and the like. One implementation includes distributed computing environments where tasks are performed by remote processing devices that are linked through a communications network. In a distributed computing environment, program modules may be located in both local and remote memory storage devices.

With reference to FIG. 3, an exemplary computing system 300 is shown having a general purpose computing device 320 that further includes a processing unit 321, a system memory 322, and a system bus 323 that couples various system components, including system memory 322, to processing unit 321. System bus 323 may be any of several types of bus structures including a memory bus or memory controller, a peripheral bus, and a local bus using any of a variety of bus architectures. The system memory includes ROM 324 and RAM 325.

A basic input/output system (BIOS) 326 of fundamental routines that enable the transfer of information between elements within personal computer 320, such as during start-up, is stored in ROM 324. Personal computer 320 further includes mass storage including a hard disk drive 327, a magnetic disk drive 328 for use with a removable magnetic disk 329, and an optical disk drive 330 for reading from or writing to a removable optical disk 331 such as a CD ROM or other optical media. Hard disk drive 327, magnetic disk drive 328, and optical disk drive 330 are coupled to system bus 323 via a hard disk drive interface 332, a magnetic disk drive interface 333, and an optical disk drive interface 334, respectively. The drives 327, 328, and 330 and their associated computer-readable media provide nonvolatile storage of computer readable instructions, data structures, program modules, and other data for personal computer 320. Although the exemplary environment described herein employs a hard disk, a removable magnetic disk 329, and a removable optical disk 331, other types of computer readable media, such as for example, magnetic cassettes, flash memory cards, digital video disks, Bernoulli cartridges, RAMs, ROMs, may also be used in the exemplary operating environment.

A number of program modules can be stored on the hard disk, magnetic disk 329, optical disk 331, ROM 324 or RAM 325, including an operating system 335, one or more application programs 336, other program modules 337, and program data 338. A user may enter commands and information into personal computer 320 through input devices such as a keyboard 340 and pointing device 342. Other input devices (not shown) may include a microphone, joystick, game controller, satellite dish, scanner, or the like. These and other input devices can be connected to processing unit 321 through a serial port interface 346 that is coupled to the system bus, but can also be connected by other interfaces, such as a parallel port, game port, an IEEE 1394-compliant port, a universal serial bus (USB) or any of a variety of ports compliant with one of several adopted wireless standards (e.g., Bluetooth, IEEE 802.xx, etc). A monitor 347 or other type of display device is also connected to system bus 323 via an interface, such as a video adapter 348. In addition to the monitor, computers can also include other peripheral output devices (not shown), such as speakers and printers.

Computer 320 may operate in a networked environment using logical connections to one or more remote computers, such as a remote computer 349. Remote computer 349 may be personal computer, a server, a router, a network PC, a peer device or other common network node, and can include many or all of the elements described above relative to personal computer 320, although only a remote memory storage device 350 has been illustrated in FIG. 3. The logical connections depicted in FIG. 3 include a local area network (LAN) 351 and a wide area network (WAN) 352. Such networking environments are commonplace in offices, enterprise-wide computer networks, intranets, and the Internet.

When used in a LAN networking environment, computer 320 is connected to local network 351 through a network interface or adapter 353. When used in a WAN networking environment, computer 320 typically includes a modem 354 or other means for establishing communications over WAN 352, such as the Internet. Modem 354, which may be internal or external, is connected to system bus 323 via serial port interface 346. In one implementation, computer 320 is a server computer operating in a networked environment, and program modules depicted relative to computer 320, or portions thereof, can be stored in the remote memory storage device 350.

Exemplary Operating Environment

Figure 4:
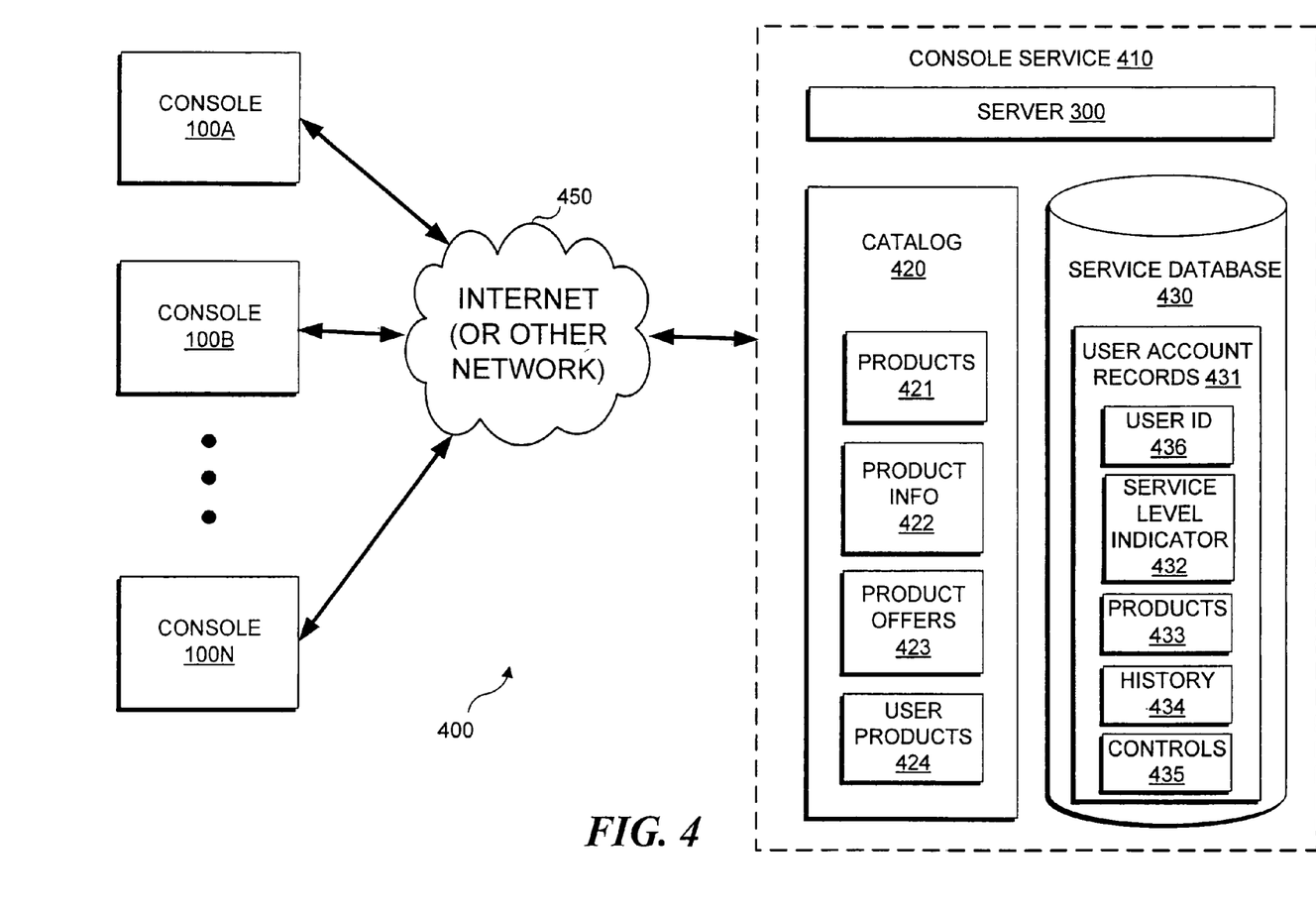
FIG. 4 is a functional block diagram of an exemplary operating environment for a system for dynamically managing user licenses for digital content.

FIG. 4 is a block diagram of an exemplary operating environment 400 for various methods and systems for enabling dynamic merchandising of products on a user console. FIG. 4 shows a console service 410 in communication with a plurality of consoles 100A-100N via communication system 450. Console service 410 further includes one (or more) server computing system(s) 300 (i.e., only one shown), a catalog 420, and a console service database 430. Catalog 420 has a plurality of product related entries, illustrated in FIG. 4 by way of example, as products 421, product information 422, product offers 423, and user products 424. Console service database 430 is shown as including a user account record 431 having a plurality of entries, illustrated again by way of example, as a service level indicator 432, products 433, a user history 434, user controls 435, and a user identifier (ID) 436.

In one implementation, each of the plurality of consoles (e.g., each of consoles 100A-100N is a gaming and media system, such as gaming and media system 100 of FIGS. 1 and 2. In general, consoles 100A-100N can be a set of electronic devices that are enabled for communication with console service 410. In one or more implementations, console service 410 is configured to provide dialog screens to a display device to enable interaction with a user. In one or more implementations, consoles 100A-100N are configured to enable transactions with console service 410 using a credit card, a prepaid card, or an electronic user account (e.g., a micro-point balance account).

Generally, any console of the above-described variety can be configured for on-line and off-line use, such that a user of an off-line console can access product information about software and components stored in memory on the console, or that has been viewed or accessed by a user and then recorded in a user history file. Furthermore, in an on-line mode, such a console can be configured to request, automatically or based on a user action, various information from the console service 410. Additionally, console service 410 can be configured to push information to the console, periodically or as discrete events, based on various data provided from the console. Console service 410 can also be configured to provide various user dialog screens for enabling a user to interact with the console service to facilitate different functions, such as shopping via a marketplace dialog screen.

Communication system 450 can be any communication system configured to communicate signals between consoles 100A-100N and console service 410. In one implementation, communication system 450 is configured as a virtual private network (VPN) that utilizes a secure protocol (e.g., secure socket layer "SSL") to communicate encrypted information through the Internet between consoles 100A-100N and console service 410. In another application, communication system 450 is implemented with calls to dedicated application program interfaces (APIs) using a secure communication protocol that enables closed-network communication between the consoles 100A-100N and console service 410. Communication system 450 thus excludes other general purpose computing devices from communicating with console service 410, so that only consoles 100A-100N are able to enjoy the benefit of the dynamic merchandising provided by the console service.

In general, console service 410 is any combination of one or more server-side devices and applications or modules configured to facilitate dynamic merchandising of products on a user console. In one implementation, console service 410 includes a server 300, a catalog 420, and a console service database 430, all in communication with each other. Console service 410 can include additional components or modules that are not relevant to the present discussion, and which are therefore omitted from the Figure for clarity.

Service data base 430 can include one or more relational databases stored in one or more data storage devices (not separately shown in this Figure) at one or more locations. In one embodiment, service database 430 includes a plurality of data records, including user account records 431.

User account records 431 can include a variety of information related to each user ID, such as an associated unique identification code or key for each user. A user account record thus associates information related to a specific user ID with other information for that user, such as a subscription service level indicator 432, i.e., an ID code that establishes the specific services available to the user ID 436 through console service 410. Each user account record 431 can also include a user history 434 that can incorporate a record of each product accessed, purchased, or viewed by the user, a tally of purchased electronic payment units and other information tied to a specific subscription-based user account. Products 432, including user products, e.g., products and content created by a user, can also be included in user account record 431. Alternatively, products 432 can contain a bundle of rights that grants permission to download a product on-demand, rather than containing an actual product. Products are generally goods and services including executable applications and application components such as games and digital game components, game levels, and game player enhancements. Products can also include various media, coupons, tangible goods, and rights in tangible goods, e.g., when a tangible good is purchased via a console and a postal fulfillment for the good is pending. In yet another implementation, user account records 431 can contain information such as user controls 435 that can indicate preferences or selections, such as parental controls selectively applied by a parent to a child's account to filter product related information, or to affect the purchase of products, or to control the display of product offers and other product related data.

Catalog 420 can include one or more data storage and processing systems (not shown) that are implemented to store and retrieve product records (e.g., products 421, product information 422, product offers 423, and user products 424). In one implementation, catalog 420 is a distributed data storage system that includes one or more databases located in one or more locations, which can be in communication via a communication system (not shown). In another implementation, catalog 420 is a component of a so-called "server farm" comprising a plurality of servers or server computing systems. In general, catalog 420 stores product related data (e.g. product records), such as executable programs including games, and/or other media or digital content, such as new game levels, game components and digital media files for movies, music, and other digital media. Product offer 423 can be metadata that can be linked with a specific product or good, such as a game, a game component, or a media file, by reference to a specific product ID, in order to advertise features of the specific product. Product offer 423 can also be a promotional offer that includes terms for purchase of a product, and the various rights that are granted with the purchase. In other implementations, product offer 423 represents a license, limited or unlimited, for a specific time period. In this case, an activation code or a prepaid card code can be used to determine when the time period begins to run for the license, or to define other aspects of the license.

In one implementation, catalog 420 stores a plurality of encapsulated executable programs (e.g., products 421) indexed for quick access and parallel download by a plurality of consoles, such as any of consoles 100A-100N that are authorized to download such products. In some implementations, each distinct product record stored in catalog 420 has a unique ID. The unique ID can include a data structure that includes product ID codes and linking codes that can indicate related products or product families, which can be useful in conducting targeted marketing to merchandise products related to other products that a user has already accessed and/or purchased.

Exemplary Methods for Marketing Goods and Digital Content on a Console

Figure 5:
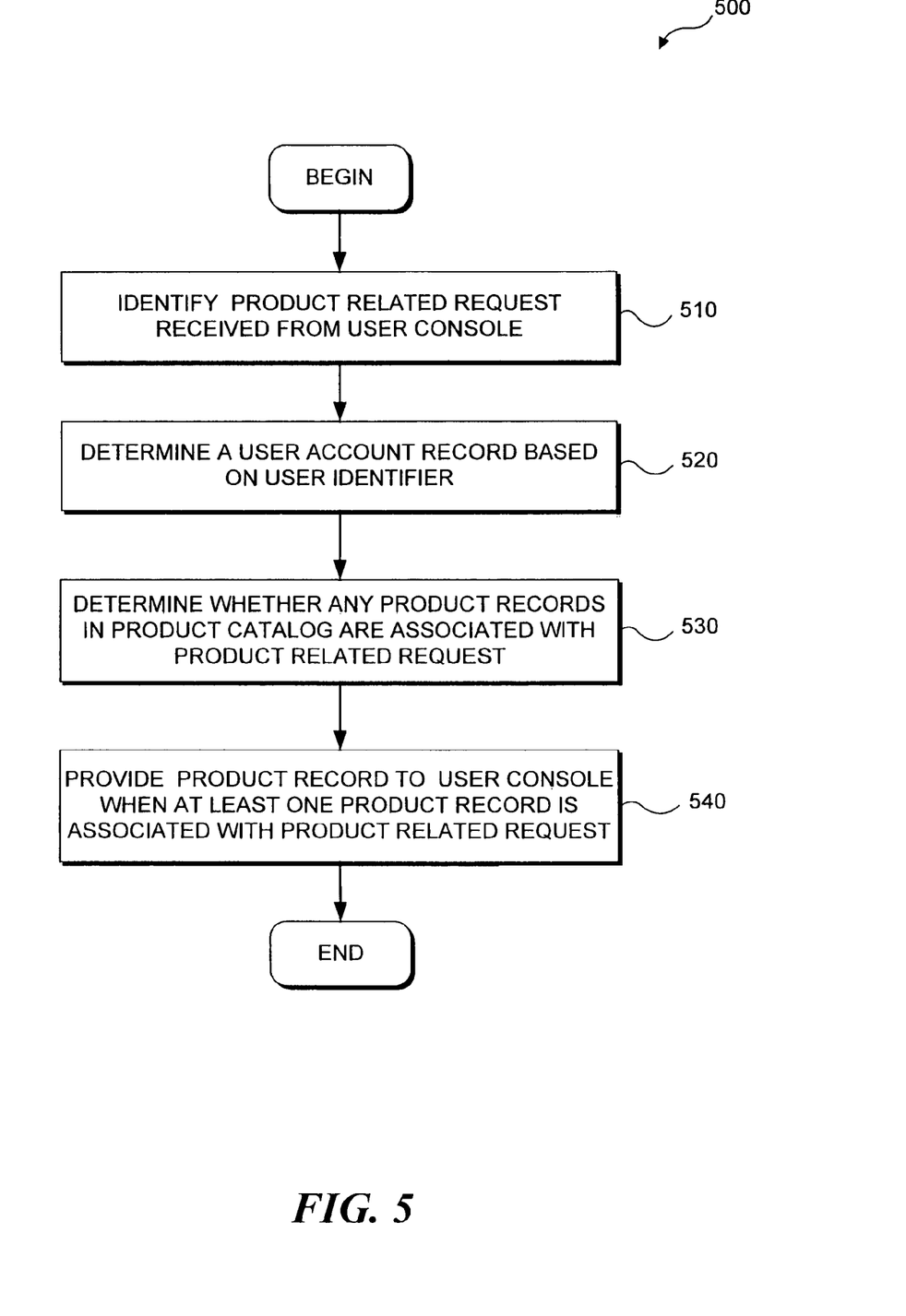
FIG. 5 is a flow diagram illustrating the steps of an exemplary method.

FIG. 5 is a flow diagram illustrating an exemplary method 500. Method 500 can be implemented in some embodiments with components, devices, and techniques as discussed with reference to FIGS. 1-4. In some implementations, one or more steps of method 500 are embodied on a computer readable medium containing computer readable code or machine instructions such that a series of steps are implemented when the computer readable code is executed by a processor. In the following description, various steps of method 500 are described with respect to one or more console service processors performing the method steps. In some implementations, certain steps of method 500 can be combined, performed simultaneously, or in a different order, without deviating from the objective of method 500 or without producing different results. Method 500 begins at a step 510.

In step 510, a product related request received from a user console is identified. In one implementation, the product related request includes a first user ID and a product ID. In one embodiment, the product related request can be identified at any time after it is received at the console service. In another embodiment, the product related request is identified by the user ID. In some implementations, the product related request can be for one or more type of data, for example, product information, pricing for a product, a product offer, or information about a user product.

In a step 520, a user account record is determined based on the user ID. In one implementation, the user ID is associated with the user account record. In this implementation, the user account record can include a subscription service level ID, and a user history associated with the user ID. The user account record can be determined at any time after the request is identified.

In a step 530, a determination is made whether any product records in the product catalog are associated with the product related request based on the user account record and the product ID. The determination whether any product records in the product catalog are associated with the product related request can be made at any time after the user account is determined.

In a step 540, when it is determined that at least one product record is associated with the product related request, the at least one product record is provided to the user console. While this step can occur at any time after the determination is made that at least one product record is associated with the product related request, in some implementations, the product record or records can be provided periodically or at discrete times.

Another implementation of method 500 can include the step of filtering the product records based on predetermined criteria. Next each of the filtered product records that matches the predetermined criteria is identified. Finally, each identified product record is associated with the user account record. In some implementations, the predetermined criteria can be one or more filters including the user history, any new product records that are identified and parental control settings. In other implementations, the predetermined criteria can be one or more filters such as any related products that are identified; any product offers that are identified, a product category and a search term received from the user console, for example.

Although not shown in FIG. 5, yet another implementation of method 500 can include the step of identifying each product record associated with the user account record that is related to the received product ID. A targeted product offer can then be generated based on one or more identified product records. In some implementations, the targeted product offer includes targeted product information related to one or more identified product records, such as a related title, a similar genre, a title by the same publisher, a component for an existing application of the first user, a cross-merchandised item, and the like. The targeted product offer is then provided to the first user console.

In another implementation of method 500, the product related request includes a product purchase order for a product associated with the product ID. In this implementation, the console service is enabled to receive payment for the purchase order submitted from a user console in the form of a credit card number, a prepaid card number; or debit of an electronic user account.

In one implementation, method 500 further includes the step of identifying a predetermined code received from the user console. In this implementation, the predetermined code is associated with a specific predetermined console service operation. The predetermined code can be from, for example, a prepaid card that can be redeemed for an electronic user account value, or a service, or a product. The identified predetermined code is then matched to the specific console service operation. The predetermined code and the specific console service operation are associated with the first user account record. The specific console service operation is then enabled for use with the user ID associated with the user account record.

In some implementations, the console service operation can be an operation such as upgrading a subscription service level, enabling the sale of a specific tangible good identified by the predetermined code, or enabling the grant of a license to a specific product identified by the predetermined code. In other implementations, the console service operation can be an operation such as adding negotiable value to an electronic user account, adding additional usable time to an existing license term, enabling access to a specific online service, or enabling a coupon redemption.

Another implementation of method 500 includes detecting when a product related request is associated with a specific user product. A user product can be a digital product created by a user such as media, graphics, game levels and skins, or a commercial product for which the user has unrestricted user rights, or even a transferable license bundle to a commercial product. In this implementation, the product ID can incorporate a second user account ID that is associated with the specific user product. Next, a determination is made as to whether any user product records associated with the second user account ID and the user product ID are in the product catalog. Finally, when at least one user product record is determined to be in the product catalog, the user product record(s) is/are provided to the first user console. In another implementation, the first user account record can be linked with a second user account record based on the second user account ID. A transfer of a user product record associated with the second user account record to the first user account record can then be carried out.

In various implementations, as discussed briefly above, the user product record can contain any of a number of digitally transferable items, such as but not limited to a digital game component, a license bundle, user created digital content or an executable application. In other implementations, the user product record can be any of a number of other digitally transferable items, including without limitation, an electronically exchangeable unit of payment, an event ticket, a redeemable coupon, a predetermined code for a console service operation, and a media file. Furthermore, a user product record can be linked to a "personal marketplace" that is associated with the user account, which enables a user to offer a "virtual store" to other users for user products, so that the virtual store is facilitated by the console service.

Figure 6:
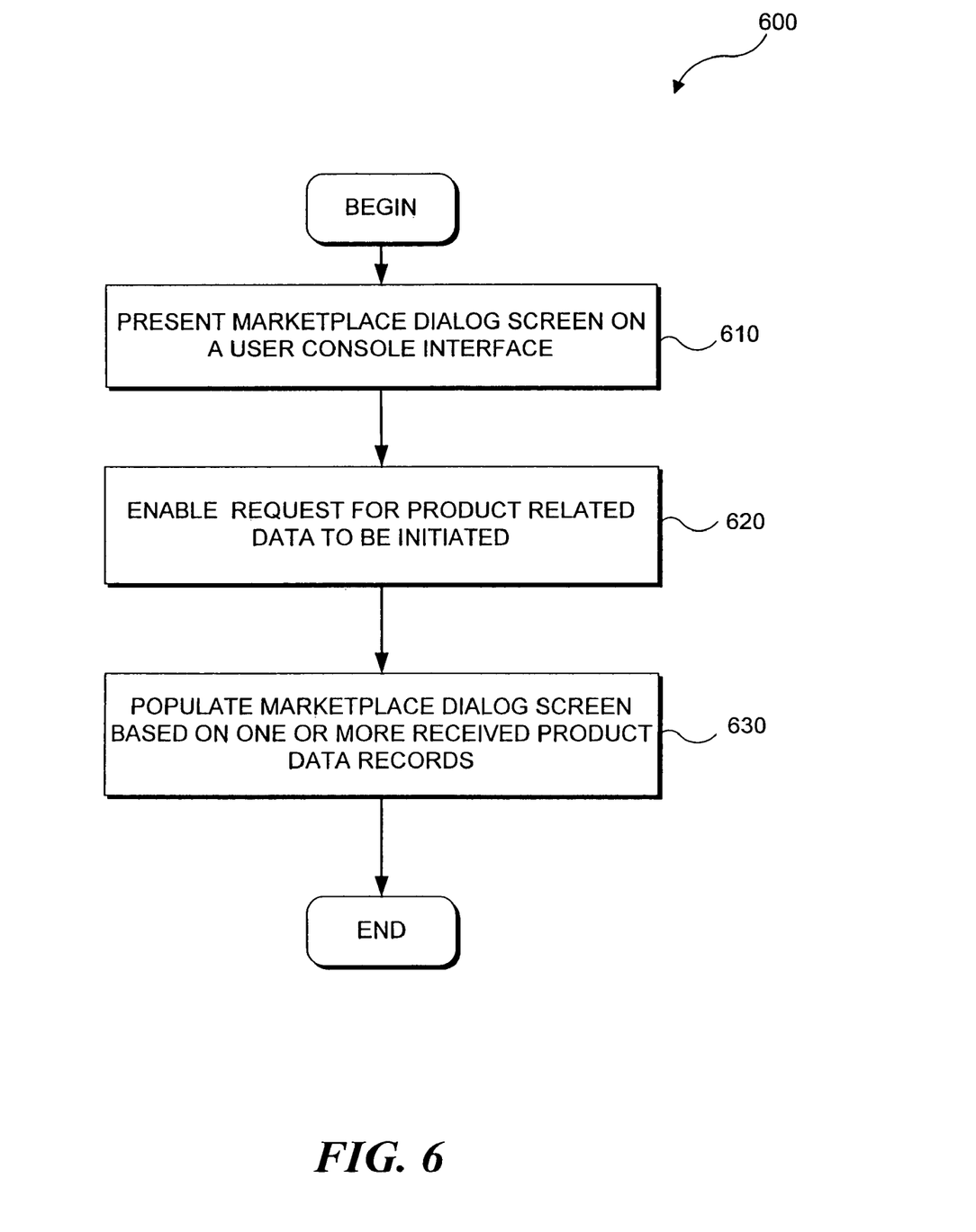
FIG. 6 is a flow diagram illustrating the steps of another exemplary method.

FIG. 6 is a flow diagram illustrating another exemplary method 600. Method 600 can be implemented in some embodiments with components, devices and techniques as discussed with reference to FIGS. 1-4. In some implementations, one or more steps of method 600 are embodied on a computer readable medium containing computer readable code or machine instructions, such that a series of steps are implemented when the computer readable code is executed on a computing device, such as by a processor. In the following description, various steps of method 600 are described with respect to a processor of a user console in a gaming and media system that is performing the method steps, in communication (as appropriate) with a console service. In some implementations, certain steps of method 600 can be combined, and performed simultaneously or in a different order, without deviating from the objective of method 600 or without producing different results. Method 600 begins at a step 610.

In step 610, a marketplace dialog screen is presented on a user console interface. The marketplace dialog screen can be any dialog screen that enables a user to access products and services from a dedicated dynamic dialog screen using a user console. On one implementation, the marketplace dialog screen can be presented when invoked by a user. In another implementation, the marketplace dialog screen can be presented automatically when a console is powered up. In yet another implementation, the electronic marketplace dialog screen can be accessed, for example, from a user guide dialog screen, an entry point from within a game that is executing, or through a promotional banner on a dialog screen.

A step 620 enables a request for product data to be initiated. In some implementations, the request for product data includes a user ID associated with a user account record, and at least one product ID. In another implementation, the user account record additionally can include a user service level indicator, and a user account history.

In a step 630, the marketplace dialog screen is populated based on one or more received product data records. In some implementations, the product data records can correspond to the requested product data and can also be based on the user account record, the service level indicator, and one or more predetermined criteria. In some implementations, the predetermined criteria can be one or more filters, including the user history, any new product records or previously accessed product records that are identified, and parental control settings. In other implementations, the predetermined criteria can be, for example, one or more filters such as any related products that are identified, any product offers that are identified, a product category, or a search term received from the user console.

Another implementation of method 600 provides access to a merchandising dialog screen from within an active application screen. In one example, the merchandising dialog screen can be a fly-out screen that is targeted to a selected range of dialog box options, such as information about a particular product, and/or a purchase option. In some implementations, the merchandising screen can be accessed from an indicator for a new item within the active application screen, a promotional banner within the active application screen, or an indicator of unviewed items within the active application screen.

Yet another implementation of method 600 includes presenting a payment dialog screen to a user display to enable a purchase transaction. In some implementations, the payment dialog screen can present payment options including use of a credit card, a prepaid card, or an electronic user account to pay for a product. A payment option selection is made, and payment information is received. In response to receiving the payment information, the payment information is provided to the console service.

Another implementation of method 600 includes the steps of accessing a specific product data application programming interface (API), and providing the product data request to a console service using the specific product data API. In some implementations, a separate API is dedicated for each type of product data request, transaction and access of the console service that can be made with a user console. In one example, a game is enabled to invoke a specific API in order to obtain information about products available for that specific game. The information can include a list of items related to the game that are available for purchase. In another example, a product record can be marked as "hidden" and is not listed to a user, but can be obtained automatically by a game or application directly through invoking an API. In this example, the product record (e.g., a new game level or a new capability) can be obtained when a user completes a prior game level or achieves at least a predefined score. In this manner, each new game level of a game can be transparently delivered to a user console on demand through an API as a game is played.

Exemplary Dialog Screens

FIGS. 7-10 graphically illustrate, through exemplary dialog screens, some interactions of the system, components and methods described in reference to FIGS. 1-6. The following description and corresponding Figures are meant only to serve as illustrative dialog screens that aid in understanding certain functionality, but are in no way intended to represent all possible combinations of dialog screens or of possible uses of the described system and methods.

Figure 7:
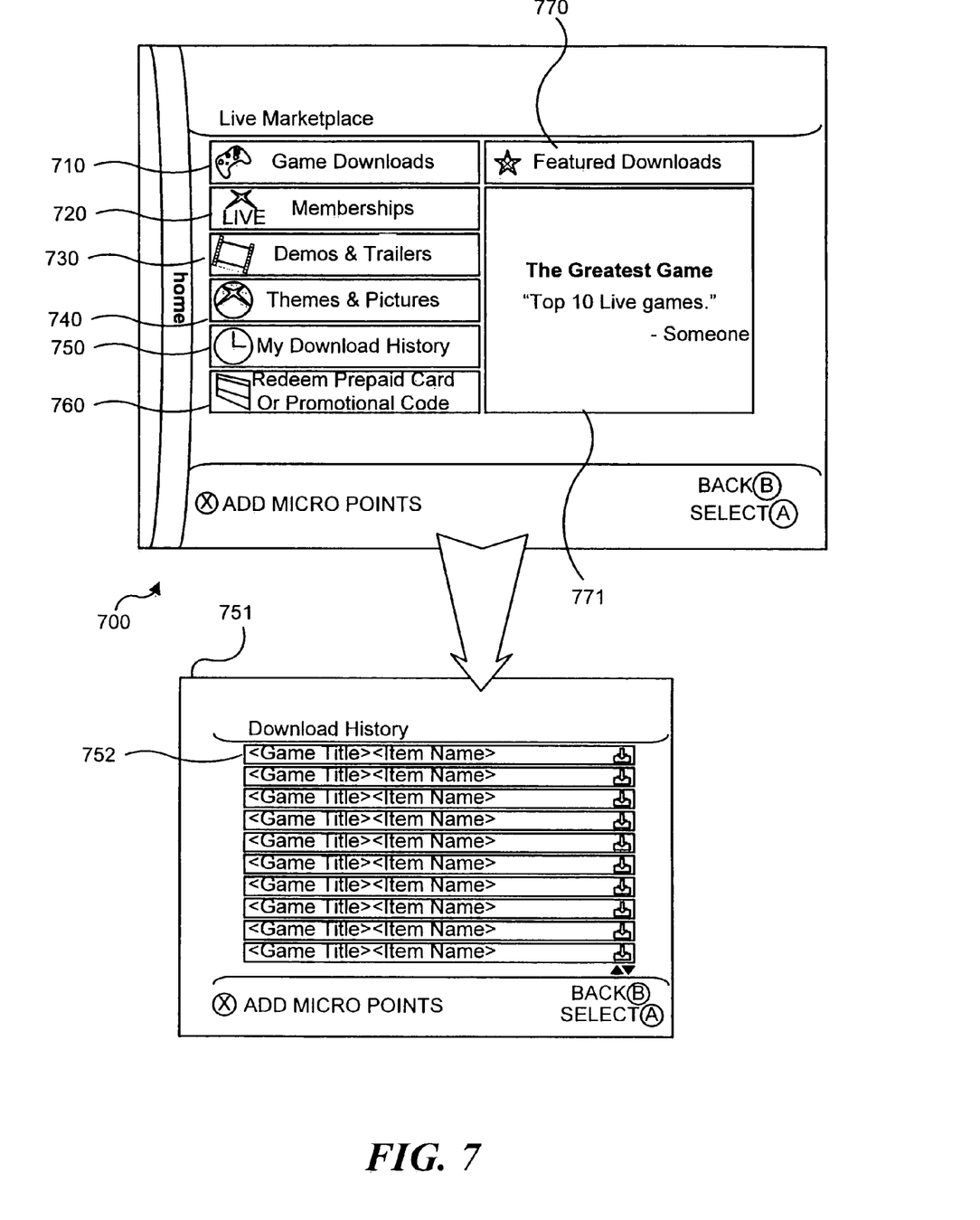
FIG. 7 is a schematic diagram of an exemplary graphical user interface dialog screen.

FIG. 7 illustrates an exemplary main dialog screen 700. The main dialog screen illustrates menu options from which a user can select using a user input device at a console or other computing device. In the example shown, main dialog screen 700 includes selections for a "Game Downloads" 710, "Memberships" 720, "Demos & Trailers" 730, "Themes & Pictures" 740, a "My Download History option" 750, and a "Redeem Prepaid Card or Promotional Code" option 760, as well as enabling the user to navigate to other dialog screens and other selections. A "Featured Download" portion 770 of main dialog screen 700 can be used for promotional items, such as games, that are advertised in a graphical window 771. Generally, a menu item can be invoked by selecting the field of the desired menu item. Dialog screen 751 of FIG. 7 represents a screen that can be presented in response to a user invoking the "My Download History" menu item in main dialog screen 700. As illustrated in FIG. 7, dialog screen 751 can include information associated with a user account, such as any digital content, e.g., games 752, that has previously been downloaded by the user associated with the specific user ID for that account.

Figure 8:
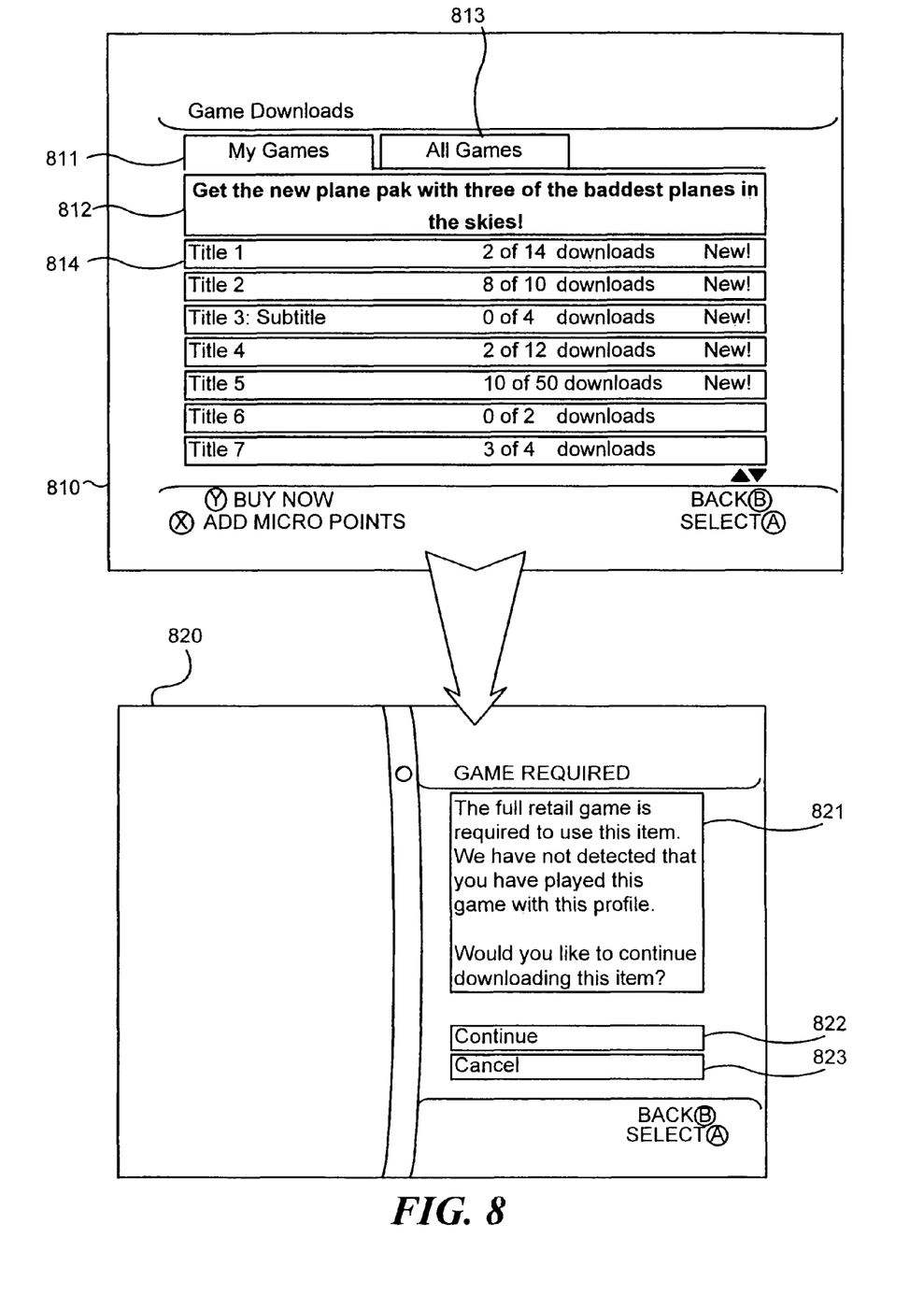
FIG. 8 is a schematic diagram of another exemplary graphical user interface dialog screen.

By way of further illustration, FIG. 8 is a schematic diagram of another exemplary graphical user interface dialog screen 810, which represents a screen that can be presented in response to a user invoking "Game Downloads" menu item 710 in main dialog screen 700 (FIG. 7). Dialog screen 810 includes tab selections, including a "My Games" tab 811, and an "All Games" tab 813, and can include promotional items 812 for games and game components. "My Games" tab 811 provides a list of content titles 814 for previously purchased products, along with identifying information about the products, including the amount of related content that has been downloaded and an indication of whether new products have become available that relate to the content title.

As a further illustration of the relationship of content to available downloads, an exemplary dialog screen 820 is presented to a user when content is invoked that is not yet downloaded. A dialog message 821 can indicate that an additional component, or even a full program, needs to be downloaded in order to proceed with the content invocation. As illustrated in FIG. 8, dialog screen 820 can present a selection 822 to continue downloading content, and a selection 823 to cancel a content download.

Figure 9:
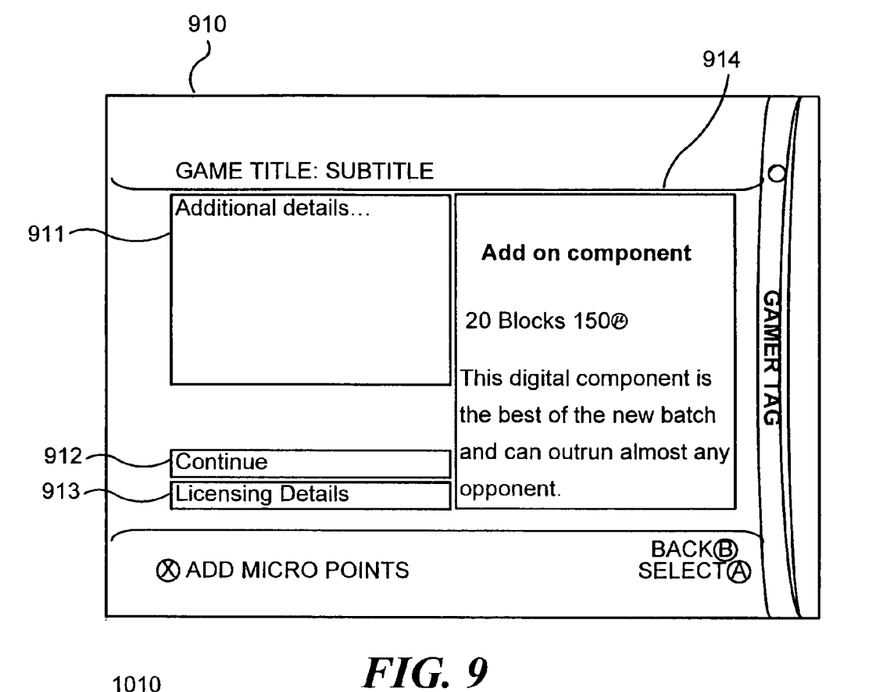
FIG. 9 is a schematic diagram of yet another exemplary graphical user interface dialog screen.

By way of another illustration, FIG. 9 illustrates an exemplary dialog screen 910 that can be presented to a user for prompting the user to obtain a digital game component. Dialog screen 910 includes details describing a game title 911, and a description of a component with an offer for acquiring a digital component 914. A user can invoke an acquisition of the digital component by selecting a "Continue" field 912, or obtain additional information about the license rights that a user obtains with the digital component, by selecting a "Licensing Details" field 913.

Figure 10:
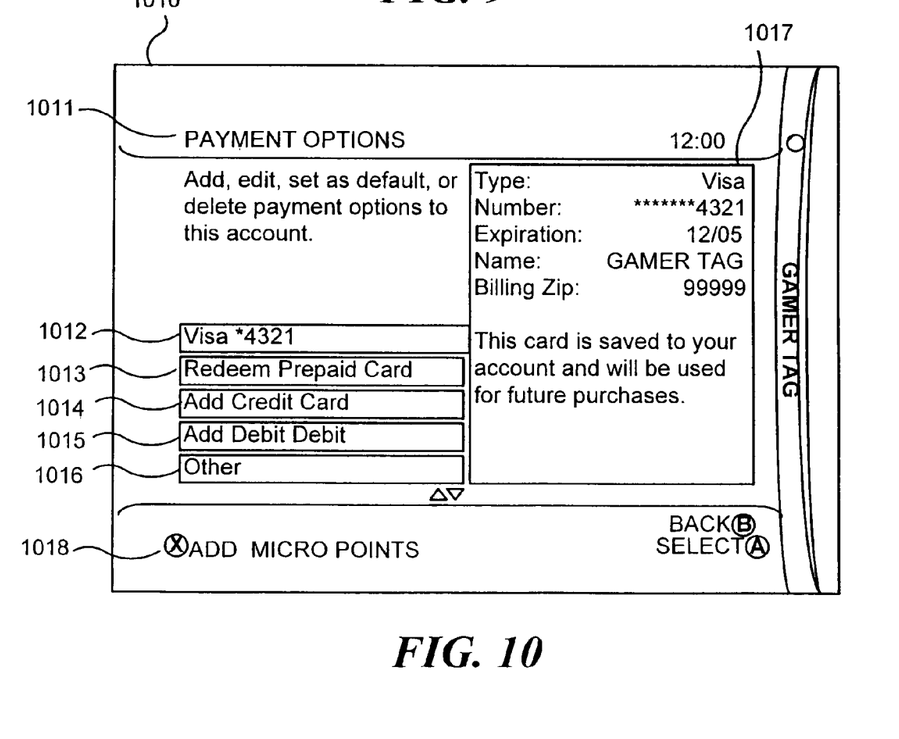
FIG. 10 is a schematic diagram of still another exemplary graphical user interface dialog screen.

By way of yet another illustration, FIG. 10 illustrates an exemplary dialog screen 1010 that can be presented to a user for prompting the user to submit payment information. Dialog screen 1010 includes a prompt description 1011 indicating the options available to the user for making payment. The payment options are depicted as dialog action buttons labeled: "Visa" 1012, "Redeem Prepaid Card" 1013, "Add Credit Card" 1014, "Add Debit Card" 1015, and "Other" 1016. Each dialog action button can invoke payment via the indicated means, or invoke another dialog screen (not shown) for enabling a user to enter information such as user account codes, passwords, and other data.

Invoking an action button can also invoke an information window 1017 in the dialog screen that provides details for the selected payment option. For example, FIG. 10 illustrates that "Visa 4321" (dialog action button 1012) is a payment option, and that a dialog window 1017 illustrates information submitted by the user to activate the payment option. In some implementations, an action button for a payment option can be used to make a purchase. For example, the "Add Micro Points" action button 1018 can invoke a purchase or transfer of value to an electronic user account from one of the payment options of dialog screen 1010.

Each of the above-described dialog screens illustrated in FIGS. 7-10 can be employed with the components of the exemplary operating environment illustrated in FIG. 4, in order to facilitate the methods described with reference to FIGS. 5 and 6. In particular, the illustrative dialog screens can be displayed to a user by a console as described in FIGS. 1 and 2, in order to enable user interaction with a console service, such as that illustrated in FIG. 4.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A system for enabling dynamic merchandizing of products on a gaming console, the system having a console service configured for executing a plurality of merchandising functions, the console service being configured for securely communicating with the gaming console over a network and including:
   a database in which are stored records employed for dynamically marketing products;
   a product catalog in communication with the database, the product catalog including a plurality of products related to a game that is played on the gaming console;
   a server computer in communication with the product catalog and the database, the server computer including a processor, and a memory in communication with the processor, the memory storing data and machine instructions that cause the processor to carry out a method comprising:
   identifying a first request received from a first gaming console, the first request including a first user identifier and a product identifier associated with the game that is played on the first gaming console;
   determining a first user account record based on the first user identifier, wherein the first user identifier is associated with the first user account record, the first user account record including a first subscription service level identifier, and a user history associated with the first user identifier;

determining whether any entries in the product catalog are associated with the first request based on the first user account record and the product identifier that is related to the game;

identifying at least one entry associated with the first request in the product catalog;

upon identifying the at least one entry associated with the first request, providing the at least one entry to the first gaming console, wherein the at least one entry comprises at least one game level for the game that is played on the first gaming console, and wherein the at least one entry is marked as a hidden entry that is not to be displayed at the first gaming console in a listing of entries associated with the first request until a particular game level is completed or until a predefined score is achieved with the game being played on the first gaming console; and receiving from the first gaming console a second request to purchase at least the game level from a payment dialogue screen that includes a real money payment option, the second request having been initiated at the first gaming console subsequent to completion of the particular game level or achievement of the predefined score, the first gaming console having generated dialogue screens, including:

a merchandizing dialogue screen that includes an indication of the game being played and a first user-selectable display control that initiates payment for the game level when selected; and the payment dialogue screen, displayed when the first display control is selected, that includes a second user-selectable display control that presents at least the real money payment option and that initiates the second request when selected.

2. The system of claim 1, wherein the memory further stores data and machine instructions that cause the processor to carry out the method, further comprising:

filtering the entries in the product catalog based on predetermined criteria;

identifying each of the filtered entries that matches the predetermined criteria; and associating each entry thus identified with the first user account record.

3. The system of claim 2 wherein the predetermined criteria includes at least one of:

the user history associated with the first user identifier;
new entries that have been identified;
a parental control setting;
related products that have been identified;
product offers that have been identified;
a product category; or
a search term received from the user console.

4. The system of claim 3, wherein the memory further stores data and machine instructions that cause the processor to carry out the method, further comprising:

identifying each entry associated with the first user account record that is related to the product identifier received;

generating a targeted product offer based on one or more identified entries, wherein the targeted product offer includes targeted product information related to the one or more entries that were identified; and providing the targeted product offer to the first user console.

5. The system of claim 1, wherein the real money payment option includes at least one of:

a credit card;
a prepaid card; or
an electronic user account.

6. The system of claim 1, wherein the memory further stores data and machine instructions that cause the processor to carry out the method, further comprising:

identifying a predetermined code received from the first user console, the predetermined code being associated with a specific predetermined console service operation;

matching the predetermined code to the specific console service operation;

associating the predetermined code and the specific console service operation with the first user account record; and enabling the specific console service operation for the first user identifier associated with the first user account record.

7. The system of claim 6, wherein the console service operation comprises at least one of:

upgrading a subscription service level;
enabling sale of a specific tangible good identified by the predetermined code;
enabling grant of a license to a specific product identified by the predetermined code;
adding a negotiable value to an electronic user account;
adding additional usable time to an existing license term;
enabling access to a specific online service; and
enabling a coupon redemption.

8. The system of claim 1, wherein the first request includes a request for at least one of:

product information;
a commercial product;
a product offer; or
a user product.

9. The system of claim 1, wherein the memory further stores data and machine instructions that cause the processor to carry out the method, further comprising:

detecting when the first request is associated with a specific user product, wherein the product identifier includes a second user account identifier associated with the specific user product;

determining whether any user entries associated with the second user account identifier and the user product identifier are in the product catalog; and when at least one user entry is determined to be in the product catalog, providing the at least one user entry to the first user console.

10. The system of claim 9, wherein the memory further stores data and machine instructions that cause the processor to carry the method, further comprising:

based on the second user account identifier, linking the first user account record with a second user account record associated with the second user identifier; and enabling a transfer of a user entry associated with the second user account record to the first user account record.

11. The system of claim 10, wherein the user entry includes at least one of:

a digital game component;
a license bundle;
user created digital content;
an executable application;
an electronically exchangeable unit of payment;
an event ticket;
a redeemable coupon;

a predetermined code for a console service operation; or
a media file.

12. A method that is implemented by a computing system, the computing system comprising:
- a processor; and
- a memory storing instructions which, when executed by the processor, implement the method comprising:
  - identifying a first request received from a first gaming console, the first request including a first user identifier and a product identifier associated with a game being played on the first gaming console;
  - determining a first user account record based on the first user identifier, wherein the first user identifier is associated with the first user account record, the first user account record including a first subscription service level identifier, and a user history associated with the first user identifier;
  - determining whether any entries in a product catalog are associated with the first request based on the first user account record and the product identifier that is related to the game;
  - identifying at least one entry associated with the first request in the product catalog;
  - upon identifying the at least one entry associated with the first request, providing the at least one entry to the first gaming console, wherein the at least one entry comprises at least one game level for the game being played on the first gaming console, and wherein the at least one entry is marked as a hidden entry that is not to be displayed at the first gaming console in a listing of entries associated with the first request until a particular game level is completed or until a predefined score is achieved with the game being played on the first gaming console; and
  - receiving from the first gaming console a second request to purchase at least the game level using a payment dialogue screen that includes a real money payment option, the second request having been initiated at the first gaming console subsequent to completion of the particular game level or achievement of the predefined score, the first gaming console having generated dialogue screens, including:
    - a merchandizing dialogue screen that includes an indication of the game being played and a first user-selectable display control that initiates payment for the game level when selected; and
    - the payment dialogue screen, displayed when the first display control is selected, that includes a second user-selectable display control that presents at least the real money payment option and that initiates the second request when selected.

13. A memory medium on which are stored machine instructions for implementing the method recited in claim 12.

14. The memory medium of claim 13, wherein the merchandizing dialog screen is accessed through an entry point from within the game being played at the first gaming console.

15. The memory medium of claim 13, wherein, from within an active application screen, the merchandizing dialog screen is accessed from at least one of:
- an element associated with a new item;
- a promotional banner; or
- an indicator of one or more unviewed items.

16. The memory medium of claim 13, wherein the real money payment option includes at least one of:
- a credit card;
- a prepaid code; or
- an electronic user account.

17. The method of claim 12, and further comprising:
- filtering the entries in the product catalog based on predetermined criteria, the predetermined criteria including the user history; and
- associating each entry produced by filtering, with the first user account record.

18. The method of claim 17, further comprising:
- identifying each entry associated with the user account record that is related to the product identifier, producing one or more identified entries;
- generating a targeted product offer based on one or more identified entries, wherein the targeted product offer includes metadata and license terms related to the one or more identified entries; and
- providing the targeted product offer to the user console.

19. The method recited in claim 12, wherein the merchandizing dialogue screen is accessed through an entry point from within the game being played at the first gaming console.

20. The method recited in claim 12, wherein the first request is received automatically from the game played at the first gaming console.

21. The method recited in claim 12, wherein the at least one entry further comprises a game component.

* * * * *